J. H. POOLE.
INNER TUBE FOR PNEUMATIC TIRES.
APPLICATION FILED FEB. 23, 1915.
1,144,239. Patented June 22, 1915.
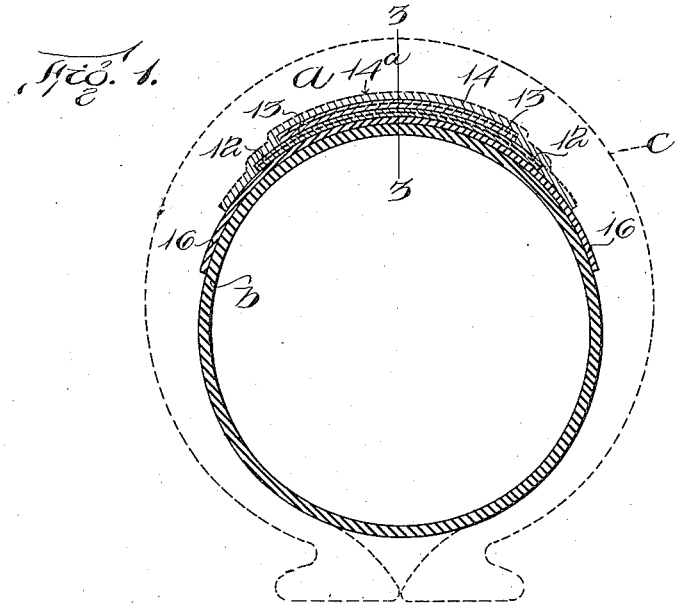
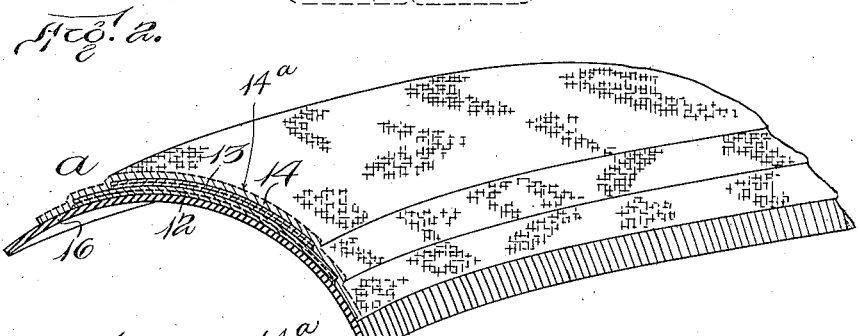
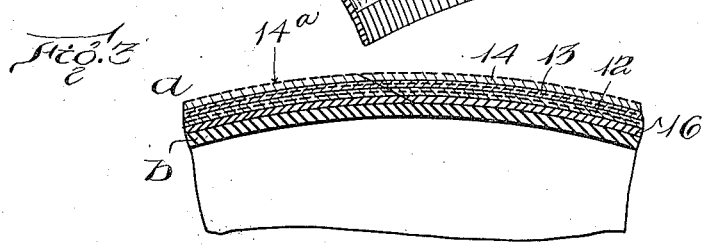
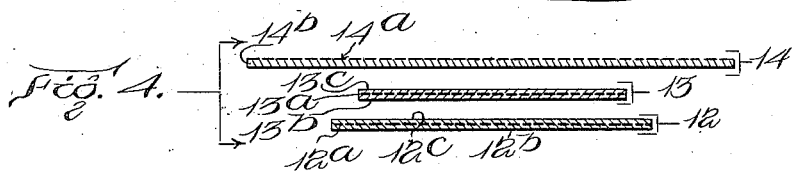
Witnesses:
F. R. Ponlstone.
H. A. Rahn
Inventor:
John H. Poole
by Wright Brown Quinby May
Attorneys

UNITED STATES PATENT OFFICE.

JOHN H. POOLE, OF AVON, MASSACHUSETTS, ASSIGNOR TO REINFORCED INNER TUBE COMPANY, OF BROCKTON, MASSACHUSETTS, A CORPORATION OF MASSACHUSETTS.

INNER TUBE FOR PNEUMATIC TIRES.

1,144,239. Specification of Letters Patent. Patented June 22, 1915.

Application filed February 23, 1915. Serial No. 9,987.

*To all whom it may concern:*

Be it known that I, JOHN H. POOLE, a citizen of the United States, and resident of Avon, in the county of Norfolk and State of Massachusetts, have invented certain new and useful Improvements in Inner Tubes for Pneumatic Tires, of which the following is a specification.

This invention has for its object to provide an inflatable inner tube the outer portion of which, or that portion adjacent to the tread portion of the shoe or casing, is inexpansible, resistant to a marked degree to penetration by a puncturing agent, and, in the event of puncture, is adapted to be kept practically air-tight by air pressure within the tube.

The invention consists in the improvements which I will now proceed to describe and claim.

Of the accompanying drawings forming a part of this specification: Figure 1 represents a sectional view, showing an inner tube embodying the invention; Fig. 2 represents a perspective sectional view, showing a portion of the inextensible member; Fig. 3 represents a section on line 3—3 of Fig. 1; Fig. 4 represents in separate sectional views the layers of the inextensible member.

My improved inner tube is composed of two general parts or members $a$ and $b$. The member $a$, which constitutes the portion of the tube adjacent to the tread portion of the usual tire shoe $c$, includes air-proof, puncture-resisting, and practically inextensible material, such as a very closely woven dense and tough textile fabric. The member $b$ is a continuous tube composed of elastic rubber adapted to expand and contract, the contacting portions of the two members being united by vulcanizing the rubber member after the parts are assembled, or by a suitable cement, the tubular rubber member having been previously vulcanized, or by both vulcanization and cement. The inextensible member $a$ covers and renders inextensible only the outer portion of the tubular elastic member $b$, or that portion thereof which is nearest the tread portion of the tire shoe.

The inextensible member $a$ is formed by assembling laminated layers, of which there are at least two. As here shown there are three layers, and said layers are of different widths to impart a transverse taper to the member $a$ from a relatively thick median portion to relatively thin edges, as shown by Figs. 1 and 2. Said layers comprise an inner layer 12, an intermediate layer 13, and an outer layer 14. The inner layer is composed of a protective fabric lamina $12^a$ and inner and outer rubber laminæ $12^b$, $12^c$. The intermediate layer is composed of a protective fabric lamina $13^a$ and inner and outer rubber laminæ $13^b$, $13^c$. The outer layer is composed of a protective fabric lamina $14^a$ and an inner rubber lamina $14^b$, the fabric lamina $14^a$ being exposed and constituting a wear-resisting outer surface contacting with the shoe $c$. Each rubber lamina is applied to the accompanying protective lamina while the rubber is unvulcanized, and the several laminæ and layers are intimately united by the process of vulcanization after the parts of the member $a$ are assembled. The rubber portions may therefore be appropriately termed binding laminæ. In assembling the unvulcanized layers I prefer to curve them transversely, the radius of the curve being approximately that of the cross section of the tubular member $b$. I also prefer to impart to the layers a longitudinal curve of longer radius, as indicated by Fig. 2, both curves being maintained during the vulcanizing process and made permanent thereby.

In practice I make up a strip of indeterminate length composed of the assembled and vulcanized layers, and then cut up the strip into lengths each suitable for the protection of one tubular member $b$, the ends of the strip meeting to form a joint (Fig. 3).

In the preferred construction here shown the inner layer 12 is of medium width, the intermediate layer 13 is narrower than the inner layer, and the outer layer 14 is wider than the inner layer, the said layers being relatively arranged, as shown by Figs. 1 and 2, to impart the described transversely tapered form, and enable the completed inner tube to conform with suitable accuracy to the inner surface of the shoe. The increased width of the outer layer enables its exposed protective lamina $14^a$ to form practically the entire outer surface of the member $a$. By making the member $a$ of a plurality of layers I am not only enabled to provide it with a relatively thick median portion and tapered edges, but I also provide a plurality of protective laminæ, each of which forms a backing for an elastic binding lamina, supports the edges of a fracture formed in any rubber portion within its area, and prevents the extension of such fracture, by preventing the rubber in which it is formed from stretching. While each protective lamina performs the function last described for the adjoining binding lamina at its inner side, the several protective laminæ coöperate in performing said function for the covered portion of the tubular member b.

16 represents a supplemental inner binding lamina of rubber vulcanized to the inner surface of the member a. When the members a and b are united the lamina 16 reinforces the covered portion of the member b.

The tube constructed as described may be inserted like an ordinary inner tube in a shoe and distended by air pressure, which stretches only the inner portion of the tubular member. The member a, being practically inextensible, is not stretched by the distending pressure, but is held firmly against the inner wall of the shoe, and prevents the stretching of the outer portion of the tubular member, the inner portion of the tubular member being stretched to the extent required to conform the inner tube to the shoe.

It will be seen that if the member a and the covered portion of the tubular member b are penetrated by a nail or tack, there will be no tendency to elongate or enlarge the break thus formed, as would be the case if said parts were distensible by the air pressure in the tube. The protective laminæ of the member a collectively constitute an inextensible backing adapted to support the edges of a fracture in the covered portion of the tubular member and in the binding laminæ, such as might be caused by a tack or nail, and causes the air pressure in the tubular member to press said edges together and close the fracture. The tubular elastic member b and the inextensible member a are made as separate parts and united after the tubular member is completely formed, hence the manufacture of the tubular member is not complicated and rendered expensive by the operation of incorporating inextensible material into the elastic material, or by inclosing the inextensible material in the elastic tube. The member a, having a relatively thick median portion, prevents injury to the tubular member b by irregularities or internal projections on the inner surface of the shoe caused by "stone bruises," and sustains wear for a considerable period in case the tread portion of the shoe is worn through, exposing the member a.

Having described my invention, I claim:

1. An inner tube for pneumatic tires, composed of a continuous tubular member of elastic rubber and an external inextensible member covering and rendering inextensible the outer portion of said tubular member, leaving the inner portion of the tubular member free to expand and contract, the inextensible member being attached to all portions of the surface of the tubular member covered thereby, and comprising superimposed intimately united laminated layers, each including a protective lamina of practically inextensible fabric and a binding lamina of rubber united thereto and to the next layer, there being at least three layers of different widths, viz., an inner layer of medium width, a narrower intermediate layer, the protective lamina of each of said layers being between and united to two binding laminæ, and an outer layer of maximum width the protective lamina of which is united at its inner side only to a binding lamina, the said layers being arranged to impart a transversely tapering form to the inextensible member as a whole, from a relatively thick median portion to relatively thin edges, the protective lamina of the outer layer being exposed and forming a wear-resisting external surface contacting with the inner surface of the shoe, which contains the inner tube.

2. An inner tube for pneumatic tires, composed of a continuous tubular member of elastic rubber and an external inextensible member covering and rendering inextensible the outer portion of said tubular member, leaving the inner portion of the tubular member free to expand and contract, the inextensible member being attached to all portions of the surface of the tubular member covered thereby, and comprising superimposed intimately united laminated layers, each including a protective lamina of practically inextensible fabric and a binding lamina of rubber united thereto and to the next layer, the protective lamina of the inner layer being between and united to two binding laminæ, each protective lamina constituting an inextensible backing adapted to support the edges of a fracture in any rubber portion within its area and prevent the enlargement of such fracture, and the series of protective laminæ performing the same function for the covered portion of the tubular member, the inextensible member being provided with a supplemental inner binding lamina which is united to and reinforces the covered portion of the tubular member.

In testimony whereof I have affixed my signature, in presence of two witnesses.

JOHN H. POOLE.

Witnesses:
C. F. BROWN,
J. MURPHY.